UNITED STATES PATENT OFFICE.

OSCAR JULIAN STEINHART, JULIUS LEONARD FOX VOGEL, AND HENRY ERNEST FRY, OF LONDON, ENGLAND; SAID STEINHART AND VOGEL ASSIGNORS TO SAID FRY.

PROCESS OF MAKING ANHYDROUS ZINC CHLORID.

SPECIFICATION forming part of Letters Patent No. 648,809, dated May 1, 1900.

Application filed April 10, 1899. Serial No. 712,511. (No specimens.)

*To all whom it may concern:*

Be it known that we, OSCAR JULIAN STEINHART and JULIUS LEONARD FOX VOGEL, electrochemists, residing at 91 Blackfriars road, London, in the county of Surrey, and HENRY ERNEST FRY, mineral merchant, residing at 5 Laurence Pountney Hill, London, England, subjects of the Queen of Great Britain, have invented a certain new and useful Process for the Manufacture of Anhydrous Zinc Chlorid from Zinc-Chlorid Solution, of which the following is a specification.

When a solution of zinc chlorid is evaporated in an open vessel and has reached such a concentration that its boiling-point has risen to about 180° centigrade, no further dehydration can be obtained without an evolution of hydrochloric acid, and although the heating is continued for a long period it is impossible owing to the hygroscopic nature of the salt to get rid of the last three or four per cent. of water, although hydrochloric acid continues to be given off by the decomposition of the water, with the accompanying formation of oxychlorid of zinc.

The object of this invention is to dehydrate zinc chlorid more effectually than has hitherto been possible and at the same time to avoid the loss of chlorin and simultaneous formation of zinc oxychlorid.

According to our invention we introduce the solution of zinc chlorid into a suitable airtight vessel and then heat the vessel externally to boil the solution and drive off water-vapor from it, while at the same time we maintain in the vessel a partial vacuum until all the moisture has been driven off and anhydrous zinc chlorid remains in the vessel in a fused state. As an alternative the first portion of the concentrating process might be conducted in the ordinary way until such a degree of concentration has been attained that the zinc chlorid would soon commence to decompose and afterward the process might be completed under reduced pressure. In either case air from which all moisture has been previously extracted may be drawn either over or through the zinc chlorid to assist in carrying off all water-vapor. Preferably we introduce the previously-dried air below the surface of the molten chlorid through a pipe extending downward from the upper part of the vessel.

By effecting or completing the dehydration of zinc chlorid under a reduced pressure in the above way we are enabled to obtain a nearly-pure dehydrated zinc chlorid containing only a slight trace of zinc oxid and less than one-half per cent. of water, whereas when the concentration is effected in the open air the percentage of water contained in the zinc chlorid can never be reduced below from three and one-half to four per cent., and when the percentage of water has been reduced to this extent the zinc chlorid will contain at least two per cent. of oxid.

What we claim is—

1. The process herein described of manufacturing dehydrated zinc chlorid, which consists in boiling a solution of zinc chlorid in a vessel in which a partial vacuum is maintained.

2. The process herein described of manufacturing dehydrated zinc chlorid without the loss of chlorin and formation of zinc oxychlorid, which consists in heating a solution of zinc chlorid in an air-tight vessel and maintaining a vacuum therein until the solution is boiled, watery vapor driven off and anhydrous zinc chlorid remains in a fused state with only a trace of zinc oxid.

3. The process herein described of manufacturing dehydrated zinc chlorid, which consists in boiling a solution of zinc chlorid in a vessel in which a partial vacuum is maintained, and at the same time passing a current of previously-dried air over or through the molten chlorid.

OSCAR JULIAN STEINHART.
JULIUS LEONARD FOX VOGEL.
HENRY ERNEST FRY.

Witnesses to the signatures of Oscar Julian Steinhart and Julius Leonard Fox Vogel:
FRED C. HARRIS,
GEO. J. B. FRANKLIN.

Witnesses to the signature of Henry Ernest Fry:
HENRY BLANCHARD STUNT,
G. F. WARREN.